Figure 1:
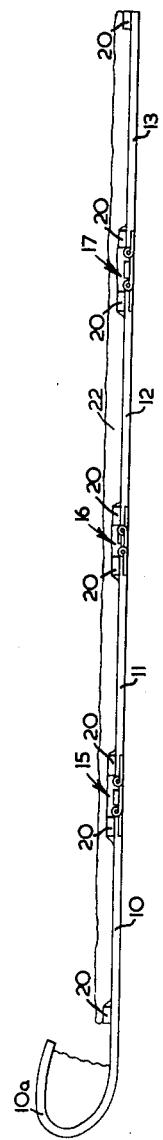

United States Patent [19]

Hooper et al.

[11] 3,982,748

[45] Sept. 28, 1976

[54] FOLDABLE TOBOGGAN

[76] Inventors: Burrell Francis Hooper; Ronald Francis Hooper, both of R.R. 1, Hyde Park, Ontario, Canada

[22] Filed: Feb. 21, 1975

[21] Appl. No.: 551,950

[30] Foreign Application Priority Data

Mar. 18, 1974 Canada.............................. 195223

[52] U.S. Cl..................................... 280/18; 280/20
[51] Int. Cl.²........................................ B62B 15/00
[58] Field of Search.................. 280/18, 20, 11.13 K; 16/163

[56] References Cited
UNITED STATES PATENTS

| | | | |
|---|---|---|---|
| 2,469,765 | 5/1949 | Fish | 280/18 |
| 3,799,566 | 3/1974 | Thompson | 280/18 |

*Primary Examiner*—Robert R. Song
*Attorney, Agent, or Firm*—Beveridge, DeGrandi, Kline & Lunsford

[57] ABSTRACT

A foldable toboggan, preferably formed of four rigid sections hinged together, in which the hinges are specially designed so as to provide spaces between the sections when folded for example to accommodate transverse reinforcements of the sections, and also preferably to accommodate a cushion which can remain on the sections when the toboggan is folded. The hinges are duplex type hinges having a central plate with its forward and rearward edges each hinged to a hinge plate secured to the respective section, the hinge plates being movable through at least 90° relative to the central plate so that the sections can be folded into parallel side-by-side relationship. Where four sections are used, two of the hinges will be such as to allow the sections connected thereby to be folded with the tops facing each other, and the central plate of the hinge means provides sufficient space both for the transverse reinforcement of sections and for the cushion. The third hinge means, which is between the previously mentioned two hinges, allows for the folding of the two sections which it connects with the bases close to each other. Means are provided which prevent the forward edge of the base of a rearward section coming below the plane of the base of the next forward section, so that this does not plow into the snow, and the hinge means also provides a substantially smooth undersurface joining the bases of the adjacent sections.

9 Claims, 8 Drawing Figures

FOLDABLE TOBOGGAN

The present invention relates to a foldable toboggan formed of a number of rigid sections hinged together so that it can easily be transported or stored in the folded condition.

Foldable toboggans have previously been proposed, for example in Canadian Pat. No. 462,444, which issued Jan. 17, 1950 to Fish, and in U.S. Pat. Nos. 2,627,422 to Pagelkopf, which issued Feb. 3, 1953 and 3,625,533 to Boe which issued Dec. 7, 1971. The hinging arrangements used in these prior patents however all use a single hinge axis connecting adjacent sections, which feature results in some drawbacks. Thus, if the hinge pins are spaced substantially above the base of the toboggan, as in the Canadian Pat. No. 462,444, to allow for space between the folded sections which can accommodate transverse stiffening members, then special means (such as the cables 74 and associated tightening means) must be used to ensure that the bases of the sections remain close together even when the toboggan is flexing, since if any space opens up between the sections then the smooth surface of the underside of the toboggan is interrupted and its progress is impeded. On the other hand, if the problem of spaces developing between the bases of the sections when the toboggan flexes is avoided by placing the hinge pins relatively close to the base, as in the two U.S. patents referred to above, then there is no substantial space between the folded sections to allow these sections to have any transverse stiffeners, and certainly not enough space to allow any cushioning means to be retained on the sections.

These drawbacks are overcome in accordance with the present invention which provides a toboggan with special hinge means joining the sections, these hinge means being such as to allow the sections to be folded parallel to each other while remaining spaced apart at least sufficiently to accommodate reinforcing transverse members on the sections, and preferably sufficiently spaced apart to accommodate cushioning means on the sections.

A foldable toboggan in accordance with the invention comprises adjacent forward and rearward sections connected together by duplex hinge means, these hinge means including a central plate having its forward and rearward edges each hinged to a respective forward and rearward hinge plate, each hinge plate holding one of the adjacent sections, the hinge plates being movable through at least 90° relative to the central plate so that the sections can be folded into parallel side-by-side relationship with the upper surfaces of said sections facing each other and with the central plate providing spacing between the folded sections. Furthermore, the hinge means include movement limiting means which prevent the forward edge of the base of the rearward section moving substantially below the plane of the base of the forward section, and the hinge means also provides a substantially smooth undersurface joining the bases of the adjacent sections.

With this arrangement, there is sufficient space between the folded sections to accommodate either reinforcing transverse members, or cushioning means, or both, and at the same time the construction of the hinge is such as to provide for a smooth movement of the toboggan over the snow.

The duplex hinge means may be arranged with the hinge knuckles projecting upwards in the operative condition of the toboggan, in which case the hinges are also arranged so that with the bases of the sections co-planar, the lower surfaces of the central and hinge plates of the hinge means lie in the same plane as said bases to provide the substantially smooth undersurface of the hinge means.

Alternatively, the central and hinge plates of the duplex hinge means may be spaced above the bases of the sections with the hinge knuckles projecting downwards in the operative condition of the toboggan, and the rear end of the base of the forward section may be provided with a rearward extension which, again in the operative position of the sections, extends underneath the forward end of the rearward section to provide the substantially smooth undersurface of the hinge means.

The preferred embodiment of toboggan has at least four rigid sections, namely first, second, third and fourth sections, which may be considered as two pairs of forward and rearward sections, the sections of each pair being joined by hinge means as described and the rearward section of the first pair may be joined to the forward section of the second pair by further duplex hinge means. These further hinge means provide 180° of movement between the second and third sections joined thereby so that these second and third sections can be folded into parallel position with their base surfaces facing each other, whereby these four sections can be folded by folding together the tops of the first and second sections, the bases of the second and third sections, and the tops of the third and fourth sections.

Figure 2:
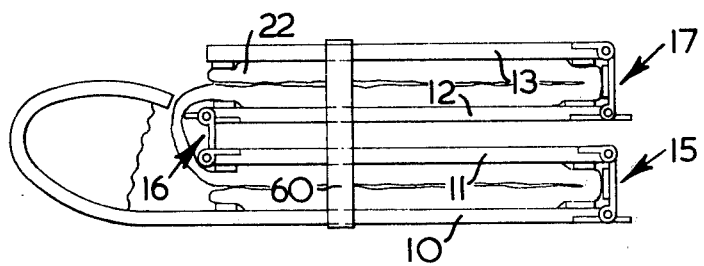
Figure 3:
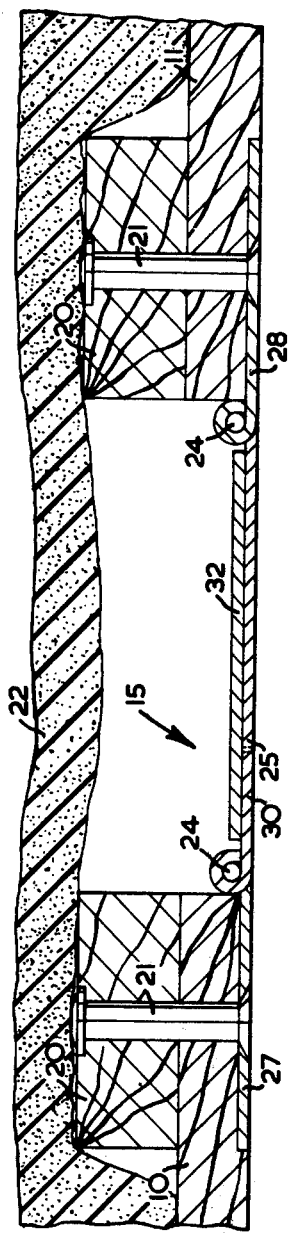
Figure 4:
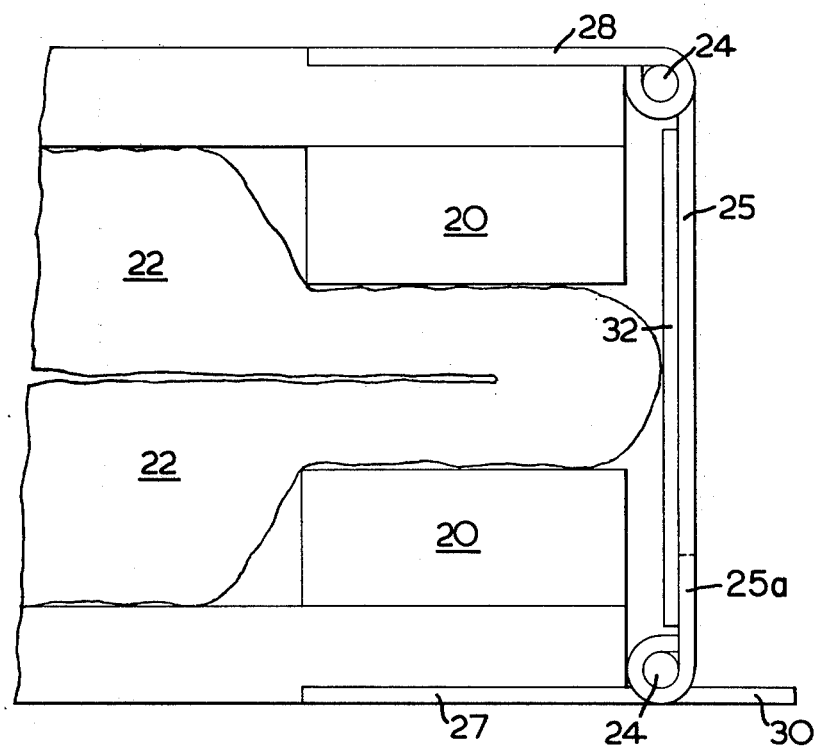
Figure 5:
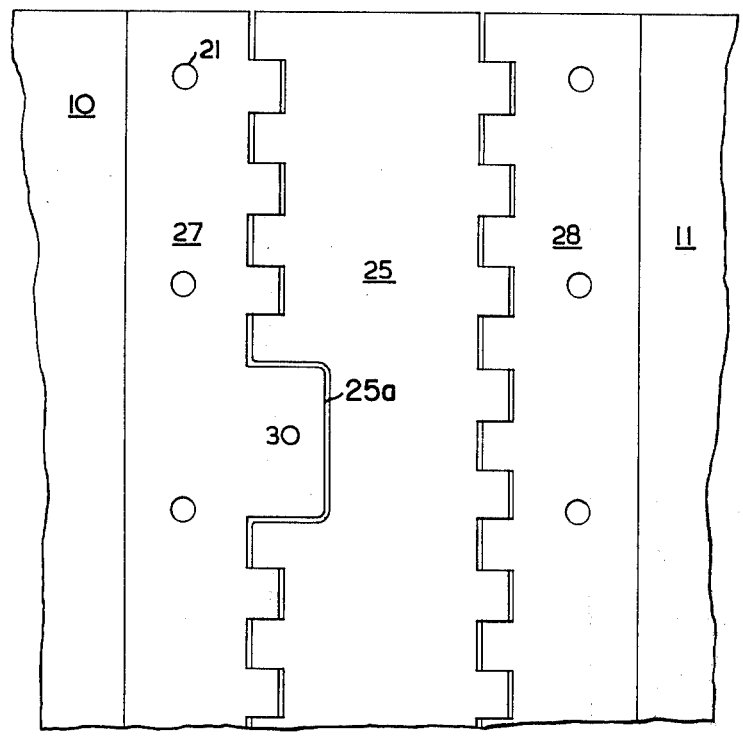
Figure 6:
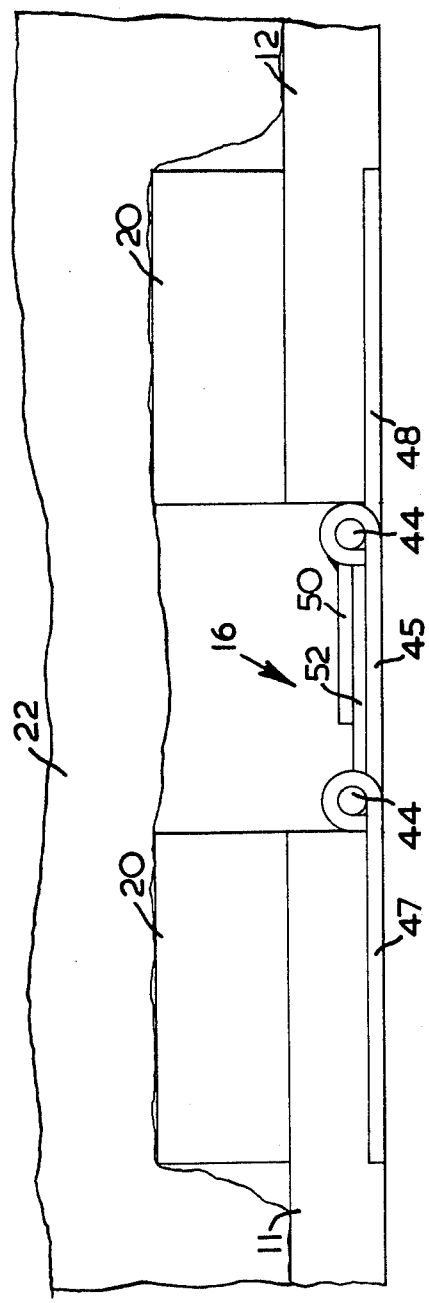
Figure 7:
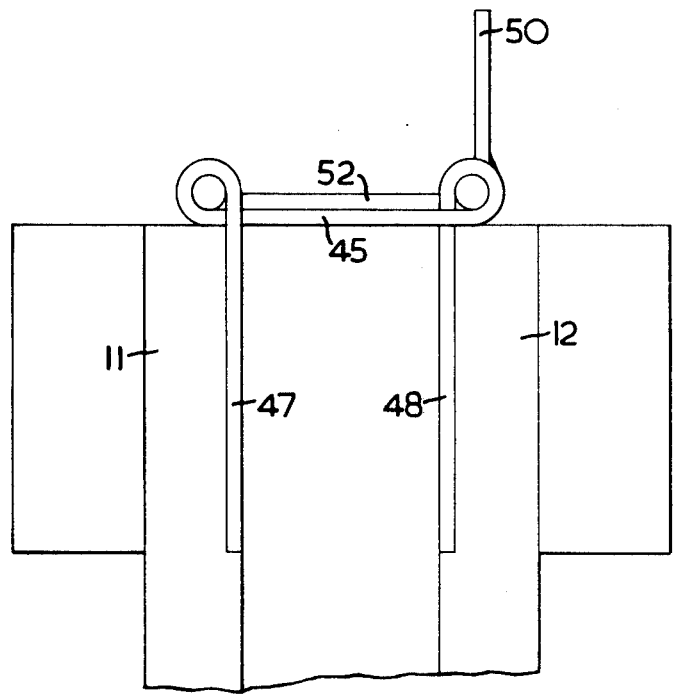
Figure 8:
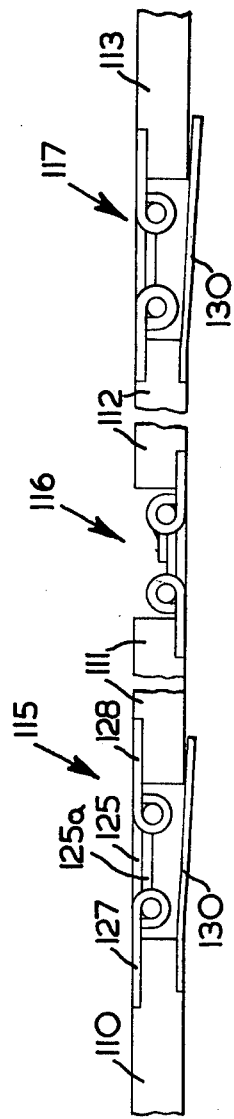

Two preferred embodiments of the invention will now be described by way of example with reference to the accompanying drawings, in which:

FIG. 1 shows a side elevation of a first embodiment of toboggan, in the operative condition, FIG. 2 shows a view similar to FIG. 1 but with the toboggan in the folded condition, FIG. 3 shows an enlarged sectional view of a first type of duplex hinge, and associated parts, in the unfolded condition, FIG. 4 shows the hinge of FIG. 3 in the folded condition, FIG. 5 shows a partial view of the underside of the hinge of FIG. 3, FIG. 6 shows a side view of a second type of duplex hinge, which joins the second and third sections of the toboggan, in the operative condition, FIG. 7 shows the hinge of FIG. 6 in the folded condition, and FIG. 8 shows a diagrammatic view of the hinges of an alternative form of the toboggan.

The embodiment shown in FIGS. 1 to 7 has four sections 10, 11, 12 and 13, hinged together by hinge means 15, 16 and 17, so as to be foldable in the manner indicated in FIG. 2 and which will be discussed in more detail below. The sections each carry two transverse reinforcing ribs 20 near the front and rear ends of the sections, and secured in place by rivets 21 shown in FIG. 3. The sections also accommodate cushioning means 22, preferably in the form of one long continuous cushion. The front section 10 has the usual upwardly and inwardly curved forward end part 10a which is standard on toboggans.

Hinge means 15 and 17 which connect the first and second, and third and fourth sections, respectively are identical and are shown in detail in FIGS. 3, 4 and 5.

Each of these hinge means is formed from two standard long hinges, each having a single hinge pin 24, and each having one of its hinge plates butt-welded to a hinge plate of the other hinge to form a so-called duplex hinge, which comprises a central plate 25 (formed of the butt welded hinge plates) having its forward and rearward edges connected by hinge pins 24 to a respective front hinge plate 27 and rear hinge plate 28. The hinge plates 27 and 28 are fitted within rebates in respectively the rearward end of the base of first section 10 and the forward end of the base of second section 11, and are held in position by the rivets 21 which also hold the transverse members 20. In the operative condition of the toboggan, as shown in FIG. 3, the hinge knuckles holding the pins 24 project upwards, and the arrangement is such that with the bases of the respective forward and rearward sections 10 and 11 co-planar, the lower surfaces of the central and hinge plates lie in the same plane as the bases of the sections to provide a substantially smooth undersurface connecting the two sections. The hinge plates 27 and 28 are each movable through at least 90° relative to the central plate 25, about the hinge pins 24, so that the sections can be folded into the position shown in FIG. 4 in which the sections are parallel and have their upper surfaces facing each other, in which position the central plate 25 provides suitable spacing between the folded sections to accommodate both the transverse stiffening members 20 and the cushion 22.

The hinges 15 and 17, as shown in FIGS. 3 to 5, both include movement limiting means which prevent the forward edge of the base of the rearward section 11 moving substantially below the plane of the base of the forward section 10. These means include a stop member 30 in the form of an extension of the front hinge plate 27 which is movable into a cut out portion 25a of the central plate 25 as indicated in FIGS..4 and 5. Two such stops 30 are provided across the width of the hinge, one of these being shown in FIG. 5. The stop member 30 cooperates with a downwardly facing lower surface of an upper stop plate 32 which covers the majority of the upper surface of the central plate 25, and which is securely welded thereto and which provides reinforcement for this plate. It will be clear that the stop member 30 has the effect of preventing movement of the central hinge plate 25 beyond the 180° position relative to the front hinge plate 27.

The central hinge means 16, connecting the second and third sections 11 and 12, and which is shown in detail in FIGS. 6 and 7, is somewhat similar to hinge means 15 and 17 in having a central hinge plate 45 connected by two hinge pins 44 located in upwardly projecting hinge knuckles to respective front and rear hinge plates 47 and 48 respectively. Also, the hinge plates are secured by rivets in rebates in the base of the rearward edge of the second section 11 and the base of the forward edge of the third section 12, all in similar manner as with hinges 15 and 17 described. Again, 90° of movement between the hinge plates 47 and 48 and the central plate 45 is provided, but in this case the movement is such that the second and third sections 11 and 12 can be folded into parallel relationship as shown in FIG. 7 with their bases facing each other. This allows a reverse fold at this central point, allowing the whole toboggan to be folded into the configuration shown in FIG. 2.

The hinge means 16 also includes means preventing the forward edge of the rearward section 12 from coming below the plane of the base of the forward section 11. This is provided for by a stop member 50 which is a long plate, extending substantially across the width of the hinge, and securely welded to the knuckle portion of the hinge plate 48 to be movable therewith. This stop member cooperates with a stop plate 52, which is a reinforcing plate extending across and welded to the central plate 45. As will be apparent from FIGS. 6 and 7, this arrangement prevents the movement of the hinge plate 48 relative to central plate 45 beyond the 180° position, or in other words prevents the central plate 45 from rising substantially above the plane of the base of section 12, so that the forward edge of the base of section 12 cannot come substantially below the plane of the base of section 11.

In operation of this embodiment, the weight of the toboggan sections, and the rider or riders, maintains the sections in alignment generally as shown in FIG. 1, although the hinge means all provide some flexibility to allow the toboggan to cling to a slightly curved surface. Also, the hinge means as described all allow the forward edge of a rearward section to rise above the rearward edge of the next forward section, this movement not affecting the progress of the toboggan. However, the interaction between the stop members and stop plates as described prevents the forward edge of a rearward section from becoming substantially below the plane of the base of the next forward section, thus preventing the central plates of the hinge means from plowing into the snow.

The toboggan thus described can be unfolded and used without any need for locking the sections into alignment, for example as are described in the aforesaid Canadian Pat. No. 462,444 to Fish. At the same time, the toboggan sections when folded can readily accommodate transverse reinforcing members 20 and cushion 22, as will be apparent from FIG. 2. The folded sections can be held in position by strap 60 shown in FIG. 2, which also serves as a carrying handle.

The embodiment shown diagrammatically in FIG. 8 has the same advantages as those of the first embodiment, and is generally similar to this first embodiment, except for the nature of the hinge means connecting the first and second, and third and fourth sections. Since the general nature of the toboggan, and of the sections, is similar this will not be described in detail.

Referring to FIG. 8, it will be seen that this shows diagrammatically a toboggan having rigid sections 110, 111, 112 and 113, hereinafter referred to as first, second, third and fourth sections respectively, these being connected by hinge means 115, 116, and 117.

The hinge means 116 are identical to hinge means 16 as described in the first embodiment, and therefore will not be further described.

The hinge means 115 and 117 are identical to each other, and are similar to the duplex hinges described in the first embodiment in incorporating a central plate 125 connected by hinge pins to front and rear hinge plates 127 and 128. The central plate is reinforced by a further plate 125a welded along its length. The hinge means is such as to allow movement of both the hinge plates 127 and 128 upwardly by 90° from the position shown, so that the first and second sections 110 and 111, and similarly the third and fourth sections 112 and 113, can be brought into a folded position where they are parallel to each other and with the upper surfaces of the sections facing each other and with space provided between the folded sections by the central plates 125. In all these respects, the hinge means 115 and 117 are similar to the hinge means 15 and 17 described for the first embodiment.

The hinge means 115 and 117 are however different from hinge means 15 and 17 in that the hinge plates 127 and 128 are spaced above the bases of the sections which they connect, and in fact as shown are received in rebates in the upper surfaces of these sections. The hinge knuckles of hinge means 115 and 117 project downwards, although their lower extremities are above the bases of the sections when these sections are in the operative condition as shown. The hinge means 115 and 117 include glide plates 130 which are rigid metal plates extending across the full width of the toboggan, and being securely riveted into small rebates in the base of the rear end of the respective sections 110 and 112. These glide plates 130 provide rearward extensions from the base of the respective forward sections 110 and 112, having a lower surface generally co-planar with the bases of the sections, and these plates 130 extend underneath about 1 inch of the forward ends of the next rearward sections 111 and 113. Thus, these glide plates perform two functions, firstly they prevent substantial movement of the forward end of the rearward sections 111 or 113 below the plane of the base of the forward sections 110 and 112, and secondly, they provide a substantially smooth undersurface joining the bases of the adjacent sections so that the toboggan slides easily.

Operation and use of the toboggan shown in the embodiment of FIG. 8 is the same as that of the first embodiment.

We claim:

1. A foldable toboggan comprising adjacent forward and rearward sections connected together by duplex hinge means, said hinge means including a central plate having its front and rear edges each hinged to a respective front and rear hinge plate, each hinge plate holding one of said adjacent sections, said hinge plates being movable through at least 90° relative to the central plate whereby said sections can be folded into parallel relationship with the upper surfaces of said sections facing each other and with said central plate providing spacing between said folded sections, said hinge means including movement limiting means which prevent the forward edge of the base of said rearward section moving substantially below the plane of the base of the forward section, said movement limiting means including an extension of the forward hinge plate extending into a recess in said central plate and forming a stop member, which member cooperates with a downwardly facing surface movable with said central plate to prevent movement of the lower surface of said central plate below the plane of the base of said forward section, said duplex hinge means being arranged with hinge knuckles projecting upwards in the operative condition of the toboggan, and wherein, with the bases of the said adjacent sections coplanar, the lower surfaces of the central and hinge plates of the hinge means lie in the same plane as said bases to provide a substantially smooth undersurface joining the bases of the adjacent sections.

2. A toboggan according to claim 1, wherein said downwardly facing surface is the lower surface of an upper plate secured to the top of said central plate and forming reinforcement therefor.

3. A toboggan according to claim 1, having at least first, second, third and fourth foldable sections including two pairs of forward and rearward sections, said pairs comprising the first and second, and third and fourth sections respectively, the sections of each pair being connected by said duplex hinge means whereby said sections of a pair can be folded into parallel relationship with each other with the central plate of each duplex hinge means providing for spacing between the sections of a pair, and wherein the second section is connected to the third section by further hinge means, said further hinge means providing 180° of movement between the second and third sections so that said second and third sections can be folded into parallel position with base surfaces facing each other, said further hinge means also providing, in operation, a substantially smooth undersurface joining the second and third sections, and whereby said four sections are foldable by folding towards each other the tops of said first and second sections, the bases of said second and third sections, and the tops of said third and fourth sections.

4. A toboggan according to claim 3, wherein said further hinge means comprises a duplex hinge including a central plate and hinge plates all having lower surfaces co-planar with the bases of the second and third sections when the latter sections are co-planar to provide a substantially smooth undersurface for said further hinge means, said further hinge means also including stop means preventing said central plate from being raised substantially above the plane of the base of said third section.

5. A toboggan according to claim 1, wherein said sections are provided with transverse stiffening means projecting upwardly above the main upper surfaces of said sections, and wherein said central plate of the hinge means provides sufficient spacing between said sections when folded into parallel relationship to accommodate at least said stiffening means.

6. A toboggan according to claim 1, wherein the toboggan is provided with cushioning means, and wherein said central plate of the hinge means provides sufficient spacing between said sections when folded into parallel relationship to accommodate said cushioning means.

7. A foldable toboggan comprising adjacent forward and rearward sections connected together by duplex hinge means including a central plate having its front and rear edges each hinged to a respective front and rear hinge plate, each hinge plate holding one of said adjacent sections, said hinge plates being movable through at least 90° relative to the central plate whereby said sections can be folded into parallel relationship with said central plate providing spacing between said folded sections, and wherein the rear end of the base of said forward section is provided with a rearward extension which, in the operative position of said sections, extends underneath the forward end of the rearward section to limit downwards movement of said forward end and to provide a substantially smooth undersurface joining the bases of the adjacent sections.

8. A foldable toboggan comprising adjacent forward and rearward sections connected together by duplex hinge means, said hinge means including a central plate having its front and rear edges each hinged to a respective front and rear hinge plate, each hinge plate holding one of said adjacent sections, said hinge plates being movable through at least 90° relative to the central plate whereby said sections can be folded into parallel relationship with the upper surfaces of said sections facing each other and with said central plate providing spacing between said folded sections, said central and hinge plates are spaced above the bases of said sections, said hinge means including movement limiting means which prevent the forward edge of the base of said rearward section moving substantially below the plane of the base of the forward section, said hinge means also including a rearward extension of the base of said forward section which, in the operative position of said sections, extends underneath the forward end of said rearward section to provide a substantially smooth undersurface joining the bases of the adjacent sections.

9. A foldable toboggan comprising at least first, second, third and fourth foldable sections including two pairs of forward and rearward sections, said pairs comprising the first and second, and third and fourth sections respectively, the sections of each pair being connected by duplex hinge means, said hinge means including a central plate having its front and rear edges each hinged to a respective front and rear hinge plate, each hinge plate holding one of said adjacent sections, said hinge plates being movable through at least 90° relative to the central plate whereby said sections can be folded into parallel relationship with the upper surfaces of said sections facing each other and with said central plate providing spacing between said folded sections, said hinge means including movement limiting means which prevent the forward edge of the base of said rearward section moving substantially below the plane of the base of the forward section, the duplex hinge means connecting the first and second, and third and fourth sections, including central and hinge plates spaced above the bases of said first and second, and third and fourth sections respectively, and rearward extensions connected to the rear ends of the bases of said first and third sections and which, in the operative condition of the toboggan, extend underneath the forward ends of the second and fourth sections respectively to provide a substantially smooth under surface therebetween, whereby said sections of a pair can be folded into parallel relationship with each other with the central plate of each duplex hinge means providing for spacing between the sections of a pair, and wherein the second section is connected to the third section by further hinge means, said further hinge means providing 180° of movement between the second and third sections so that said second and third sections can be folded into parallel position with base surfaces facing each other, said further hinge means also providing, in operation, a substantially smooth undersurface joining the second and third sections, and whereby said four sections are foldable by folding towards each other the tops of said first and second sections, the bases of said second and third sections, and the tops of said third and fourth sections.

* * * * *